(12) United States Patent
Degani et al.

(10) Patent No.: US 10,761,205 B2
(45) Date of Patent: Sep. 1, 2020

(54) SYSTEMS FOR DETERMINING TARGET DIRECTION AND METHODS THEREFOR

(71) Applicant: Inxpect S.p.A., Brescia (IT)

(72) Inventors: Alessio Degani, Brescia (IT); Federico Papi, Brescia (IT); Filippo Parrini, Florence (IT); Alessandro Spinetti, Brescia (IT)

(73) Assignee: INXPECT S.P.A., Brescia (BS) (IT)

( * ) Notice: Subject to any disclaimer, the term of this patent is extended or adjusted under 35 U.S.C. 154(b) by 252 days.

(21) Appl. No.: 16/015,250

(22) Filed: Jun. 22, 2018

(65) Prior Publication Data

US 2018/0372861 A1 Dec. 27, 2018

(30) Foreign Application Priority Data

Jun. 23, 2017 (IT) .......................... 102017000070666

(51) Int. Cl.
| | | |
|---|---|---|
| *G01S 13/87* | (2006.01) | |
| *G01S 13/42* | (2006.01) | |
| *G01S 13/88* | (2006.01) | |
| *G01S 13/34* | (2006.01) | |
| *G01S 7/35* | (2006.01) | |
| *G01S 13/02* | (2006.01) | |

(52) U.S. Cl.
CPC ............ *G01S 13/878* (2013.01); *G01S 7/352* (2013.01); *G01S 13/0209* (2013.01); *G01S 13/34* (2013.01); *G01S 13/42* (2013.01); *G01S 13/886* (2013.01)

(58) Field of Classification Search
CPC ........ G01S 11/06; G01S 5/0247; G01S 5/163; G01S 5/186; G01S 11/02; G01S 13/42; G01S 15/10; G01S 17/10; G01S 7/352; G01S 13/56; G01S 13/582; G01S 13/70
See application file for complete search history.

(56) References Cited

U.S. PATENT DOCUMENTS

| | | | |
|---|---|---|---|
| 5,181,037 A | 1/1993 | Komatsu | |
| 5,248,975 A | 9/1993 | Schutz | |
| 5,369,409 A | 11/1994 | Urabe et al. | |

(Continued)

FOREIGN PATENT DOCUMENTS

EP 0766100 B1 3/2001

OTHER PUBLICATIONS

Italian Search Report and Written Opinion dated Mar. 6, 2018, in corresponding Italian Patent Application No. 102017000070666, 11 pages.

*Primary Examiner* — Olumide Ajibade Akonai
(74) *Attorney, Agent, or Firm* — MH2 Technology Law Group, LLP

(57) ABSTRACT

A system (1) and a method for finding the direction (θ) of a target (6) in a detection plane, e.g. the azimuthal plane. The system comprises a plurality of transceivers (2a, 2b, 2c) which transmit continuous-wave radio signals (4) oriented in distinct main directions of transmission (5a, 5b, 5c) and receive a return radio signal (7) reflected from a target (6), wherein the transceivers have partially overlapping angular fields of view. A controller (9) analyzes the transmitted and return signals by calculating signal amplitudes associated with the return signals and determining the direction (θ) of the target as a direction of a mean signal vector obtained from signal vectors having as a modulus the signal amplitudes of respective transceivers.

15 Claims, 7 Drawing Sheets

(56) References Cited

U.S. PATENT DOCUMENTS

| | | | |
|---|---|---|---|
| 5,448,244 | A | 9/1995 | Komatsu et al. |
| 5,940,011 | A | 8/1999 | Agravante et al. |
| 5,949,365 | A | 9/1999 | Wagner |
| 6,160,638 | A | 12/2000 | Yasuda |
| 6,225,942 | B1 | 5/2001 | Alon |
| 6,518,916 | B1 | 2/2003 | Ashihara et al. |
| 8,446,311 | B2 | 5/2013 | Ricci et al. |
| 8,638,139 | B2 | 1/2014 | Keaveney et al. |
| 10,338,216 | B2 * | 7/2019 | Bialer .................. G01S 13/931 |
| 2006/0262007 | A1 | 11/2006 | Bonthron et al. |
| 2007/0194976 | A1 | 8/2007 | Reed et al. |
| 2011/0279669 | A1 * | 11/2011 | Longstaff ............. G05D 1/0858 |
| | | | 348/135 |
| 2012/0112952 | A1 * | 5/2012 | Logan .................. G01S 13/282 |
| | | | 342/118 |
| 2015/0198697 | A1 * | 7/2015 | Kishigami ............ G01S 13/325 |
| | | | 342/145 |

* cited by examiner

SYSTEMS FOR DETERMINING TARGET DIRECTION AND METHODS THEREFOR

CROSS-REFERENCE TO RELATED APPLICATION(S)

This application claims priority under 35 U.S.C. § 119 from Italian Patent Application No. 102017000070666, filed on Jun. 23, 2017, in the Italian Patent and Trademark Office ("IPTO"), the entire contents of which are incorporated herein by reference.

DESCRIPTION

Field of the Invention

The present invention relates to a system and a method for determining the direction of a target in a detection plane, e.g. the azimuthal plane, which uses continuous-wave radio signals. Particularly, the invention relates to a system with transmitting antennas that are close to each other and oriented in distinct directions, wherein a controller analyzes the information obtained from the return signals reflected from a target to determine the direction thereof in a detection plane and, according to certain preferred embodiments, the distance of the target.

Description of the Prior Art

Radar systems are used to detect the position and possibly the velocity of a body or an object at a distance in space, by transmitting electromagnetic energy and observing back-scattering. The position of the target to be located is generally determined by its distance from the radar and the direction in which it is situated, which is generally expressed in terms of angle of elevation and azimuth angle.

A field of application of radar systems is the field of intrusion prevention systems, such as perimeter monitoring barriers and systems for detecting and possibly tracking intruding bodies in an area to be protected. These systems are based on one or more transceivers having antennas that transmit radio signals and receive return signals reflected from the targets within an angular observation field. The number and arrangement of the transmitting antennas and the receive antennas are generally selected according to the desired angular extent of the field of view and the range.

Continuous-wave radars use continuous-wave radio transmission signals. An unmodulated continuous-wave transmitting transceiver, i.e transmitting at a constant frequency, referred to hereinafter as CW, utilizes the Doppler effect in the signal reflected from a target that moves with an instantaneous velocity change calculated as a change of the path that connects the transmitter, the target and the receiver. One field of application of the foregoing is the field of intrusion prevention systems. These transceivers cannot detect the distance that separates the transceiver from the object because the delay between the signal transmission time and its return cannot be measured. While CW transceivers cannot locate a target (i.e. cannot measure the range), and are not properly radar transceivers, they are often indicated as such and here the terms radar system and radar transceivers are intended to also contemplate unmodulated continuous-wave transceivers, unless otherwise stated.

In order to detect the distance of an object, radar systems use frequency-modulated continuous-wave radio signals, and Stepped Frequency Continuous-Wave (SFCW) radars and Frequency-Modulated Continuous Wave (FMCW) radars are among these.

In the SFCW technique, radar transceivers operate in the frequency domain and the transmission signal is constructed by transmitting a finite number of distinct sinusoids (generally known as tones) having a constant amplitude in a frequency band, with discrete frequency steps. Each frequency is maintained for as long as required to allow the transmitted signal to cover the entire round-trip path from a target at the maximum detectable distance.

FMCW radars have gained increasing interest in recent years. The transmission of a radio-frequency signal of this type allows the distance of a target from the radar to be determined from the frequency difference between the transmitted signal and the return signal reflected from the target, because the frequency difference is related with the time delay between the two signals.

U.S. Pat. No. 8,638,139 discloses a Phased Locked Loop (PLL) device frequency synthesizer joined to a voltage controlled oscillator for generating a frequency sweep signal that can be used with FMCW radar systems. The frequency sweeps starts from an initial value and increases or decreases in ramp fashion to a final value. A succession of appropriately combined ramps may create modulations with frequencies varying with triangular to saw-tooth waveforms.

Generally, a single frequency-modulated continuous-wave transceiver with a transmitting antenna and a receiving antenna, or a single receiving and transmitting antenna (monostatic arrangement with reception and transmission along the same optical axis) is sufficient to determine the distance of the target. In order to determine the direction of the target, multiple receiving antennas are typically used, and the direction of the target is determined by comparing the signals detected by the various receiving antennas.

U.S. Pat. Nos. 5,448,244, 5,181,037 and 5,369,409 disclose a calculation of a target direction based on the directivity of a plurality of transceivers that transmit radio signals with radial patterns. The target direction is estimated as an average of the transmission directions weighted based on the amplitude of the received signals.

Further examples of radars in which the direction of a target is determined based on the signals of a plurality of transceivers are disclosed in EP 0766100, U.S. Pat. Nos. 8,446,311, 5,248,975, 6,160,638, 5,949,365 and U.S. Pat. No. 6,225,942.

SUMMARY OF THE INVENTION

One object of the invention is to accurately determine the direction of one or more targets in the field of view of a radar system, particularly a radar for intrusion monitoring.

This and other objects are fulfilled by a radar system and a method of determining the direction of a target as defined in any of the accompanying claims.

According to the invention, a plurality of continuous-wave radio signals are transmitted in distinct main directions of transmission in at least partially overlapping fields of view. The direction of the target is calculated as an average of the directions of transmission of the signals in which the target has been detected, weighted according to the relative amplitudes of the signal reflected from the target.

In the preferred embodiment, the amplitude of the signal reflected from the target is calculated from a range profile which expresses the signal amplitude as a function of distance. Then, target-representing peaks are selected in the range profile, a respective interval of distances is defined for each target, and the range profiles for signals transmitted in various directions are integrated in such interval of distances.

Advantageously, signal amplitude contributions for multiple targets placed at different distances from the transceivers may be separated to determine the direction of each target without interference from the remaining targets.

BRIEF DESCRIPTION OF THE DRAWINGS

The features and advantages of the present invention will result from the following detailed description of a possible practical embodiment, illustrated as a non-limiting example in the set of drawings, in which.

The radar system as shown in the accompanying figures shall be deemed to be schematically illustrated, not necessarily drawn to scale, and not necessarily representing the actual proportions of its parts.

DETAILED DESCRIPTION

A radar system according to one embodiment of the invention will be described hereinafter. In addition to a radar system, the invention also addresses a method of determining the direction of a target and preferably the distance thereof from the system. The skilled person will easily recognize that the tasks performed by the individual parts of the radar system may be deemed to be steps of the aforementioned method, even when this is not expressly stated.

Figure 1:
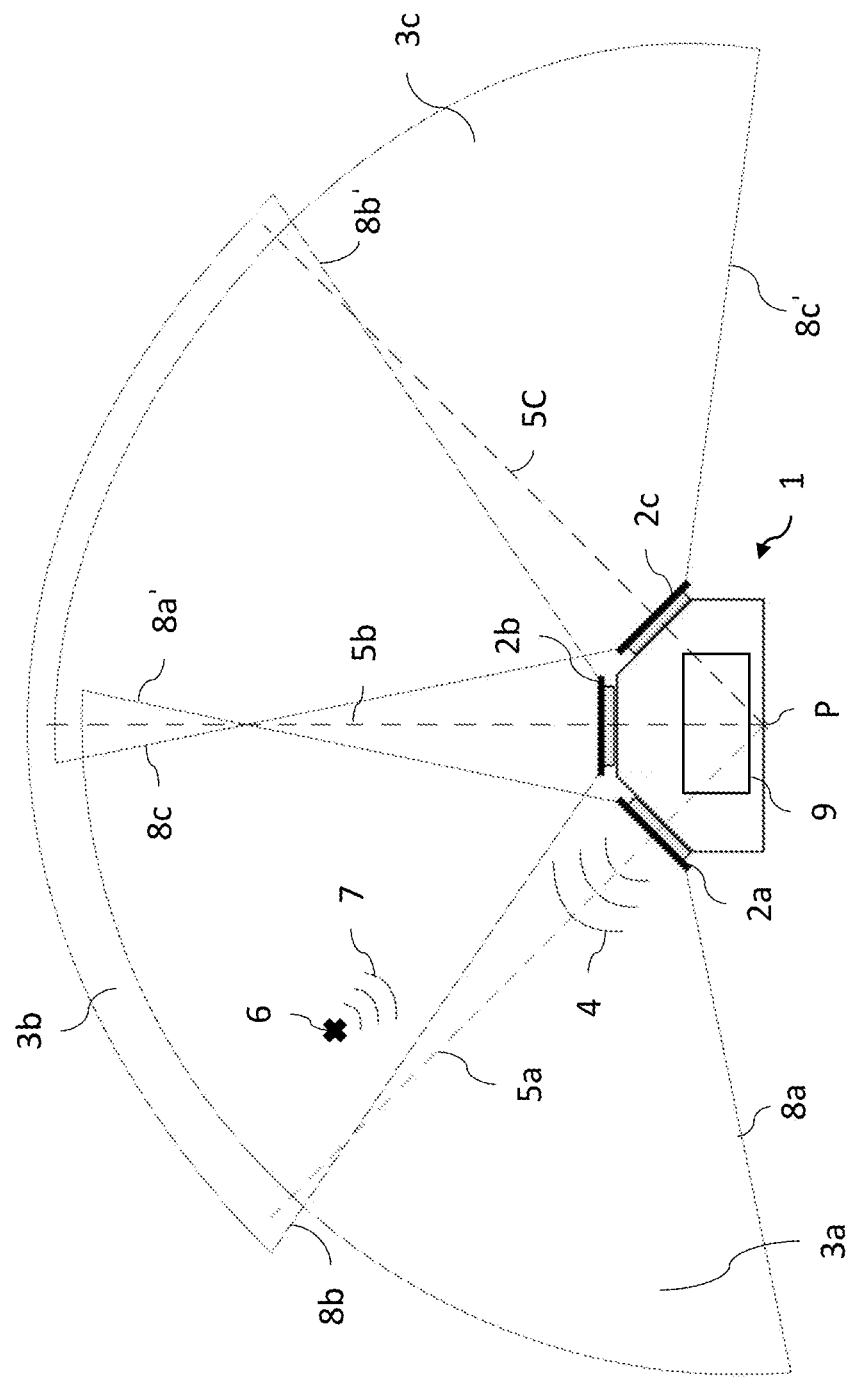
FIG. 1 schematically shows a radar system according to one embodiment of the invention.
Figure 2:
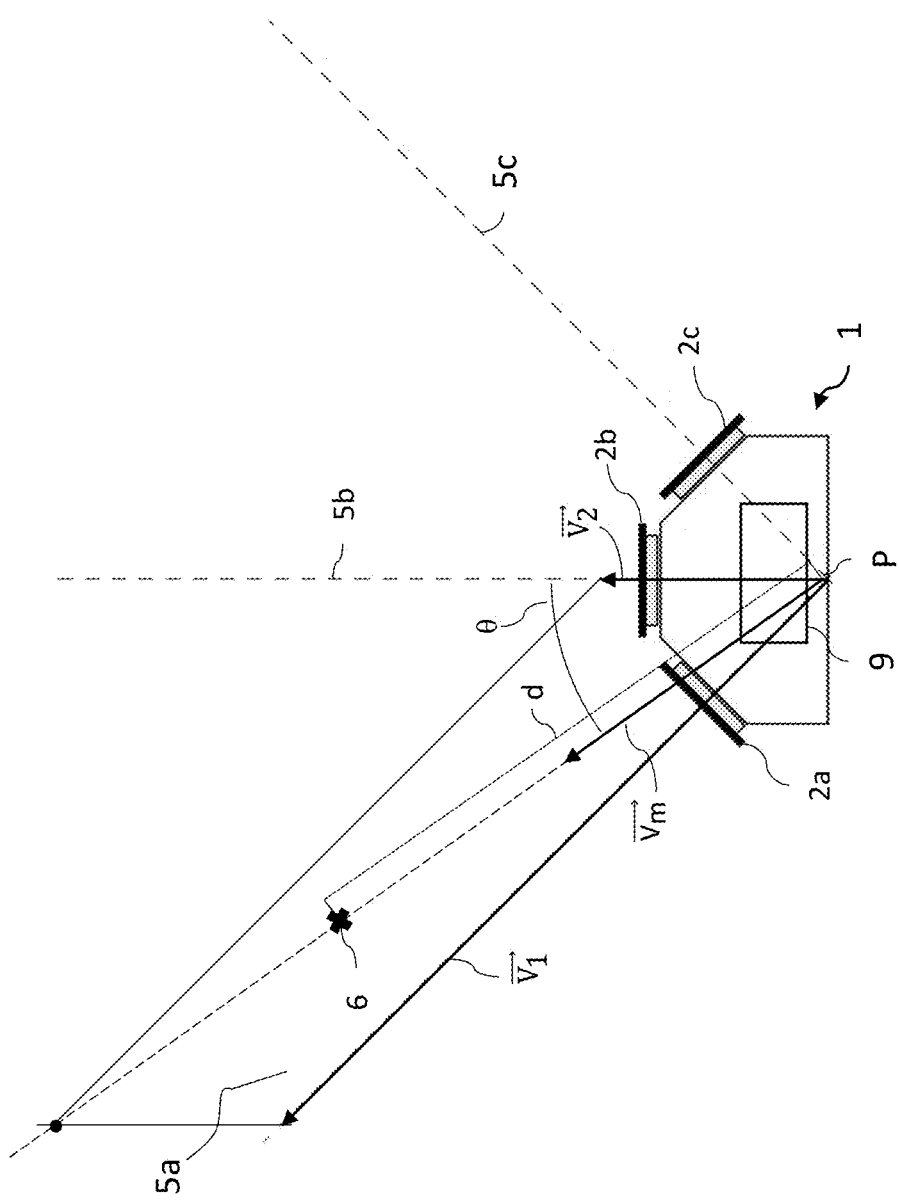
FIG. 2 schematically shows a graphical illustration of a processing step carried out by the radar system.

FIGS. 1 and 2 show an exemplary radar system according to one embodiment of the present invention, generally designated by numeral 1.

The radar system 1 comprises a plurality of transceivers 2a, 2b, 2c, which may be substantially identical in terms of construction and/or functional parameters, according to their respective tolerances. Each transceiver is configured to transmit continuous-wave transmission radio signals which cover respective angular fields of view 3a, 3b, 3c. A transmission radio signal 4 transmitted by a transceiver 2a is incident on a target 6 in its field of view 3 and is backscattered therefrom. Each transceiver 2a, 2b, 2c is configured to receive the return signal reflected from the target.

For this purpose, each transceiver 2a, 2b, 2c comprises at least one antenna. In the preferred embodiments, each transceiver 2a, 2b, 2c includes a single antenna for transmitting and receiving the signal, which means that the transceivers are monostatic, or a pair of distinct antennas for only transmitting and only receiving the signal respectively, placed at a mutual distance that is much smaller than the distance between the transceiver and any target. The latter case is usually referred to as pseudo-monostatic transceivers. Reference will be made herein to a monostatic radar system if each transceiver of the plurality of transceivers is either monostatic or pseudo-monostatic. Preferably, each transceiver is pseudo-monostatic.

In one embodiment, the radar system employs radio waves having a frequency that ranges from 20 to 30 GHz, namely from 24.00 to 24.25 GHz, as required by the standard EN 300 440.

Each transceiver of the plurality is configured to generate the transmission signal according to a known time function, as described in greater detail below. The return signal reflected from the target is retrieved by the receiving antenna of the same transceiver. As is known per se, the return signal is frequency-demodulated by a mixer (or demodulator), which beats the return signal with a copy of the transmission signal, and is filtered with a filter that selects the frequency difference component thereby converting the return signal into a baseband signal.

The analog baseband signal is at a difference frequency |Δf|, given by the difference between the frequency of the return signal and the frequency of the transmitted signal, and also indicated as beat frequency ($f_B$).

For these purposes, each transceiver comprises a signal generator for generating a continuous wave with a desired waveform, a TX module (transmitting antenna) which typically comprises a transmission signal amplifier, a RX module (receiving antenna), a radio signal mixer and an analog filter.

The system 1 comprises an electronic controller 9 connected to each of the radio transceivers 2a, 2b, 2c and configured to process the output signals from each transceiver. Particularly, the electronic controller can receive data from each transceiver, process data and transmit controls to the transceivers, and comprises one or more control units and one or more processors. Various processing steps of a detection method as described hereinafter may be carried out using programs implemented in hardware and/or software components residing in the electronic controller.

The electronic controller 9 is preferably configured to process the baseband signals to obtain a range profile for each transceiver, which range profile consists of a signal amplitude profile, as a function of the distance from the transceivers, or of a quantity that is equivalent to the distance. The range profile may be obtained with various known techniques, which depend inter alia by the waveform of the transmission signal, and which will be discussed hereinafter.

The preferred arrangement of the transceivers will be now described, which arrangement allows determination of the direction of a target in the field of view of the radar, by analyzing baseband signals and/or range profiles of the various transceivers.

The transceivers are arranged close to each other such that, for a target 6 that falls within the field of view of the system 1, the distance d from the target 6 may be deemed to be substantially equal for each transceiver that detects the target in its field of view. In practice, in the common cases of interest, the distance between two adjacent transceivers is much smaller than the minimum distance at which the transceiver detects a target. In one embodiment, the length of the field of view 3a, 3b, 3c of the radar system 1 is greater than 50 cm.

Preferably, the plurality of transceivers are horizontally arranged on a common plane. In the case of planar antennas, the distance between two transceivers is defined on the plane in which the antennas lie (i.e. perpendicular to the detection plane), as a distance between the centers of the transmission antennas of two adjacent transceivers.

Preferably, the distance between two adjacent transceivers is less than 10 cm, more preferably less than 4 cm. In the configuration of the system of FIGS. 1 and 2 and in one example, the distance between the centers of the transmission antennas of the external transceivers 2a and 2c, in the plane in which the antennas lie, is approximately 7 cm.

The minimum distance between transceivers may at least partially depend on the physical dimensions of the same transceivers. In certain embodiments, each transceiver of the plurality of transceivers radar has a surface area of less than 50 cm², preferably less than 10 cm².

In one embodiment, the plurality of transceivers are arranged in such a manner that the transceivers of the plurality are directly adjacent in pairs. The term "directly adjacent" is intended to indicate that two adjacent transceivers are located as close as possible to or in contact with each other, considering the construction of the transceivers.

Adjacent angular fields of view (e.g. 2a or 2b, or 2b and 2c) of the plurality of transceivers partially overlap, such that a target may be observed by at least two transceivers at the same time. The respective plurality of fields of view of the plurality of radar transceivers forms a field of view that defines a continuous region in space in a detection plane. The width of the field view of the radar system obtained by joining the fields of view of the plurality of transceivers will be referred to hereinafter as a viewing angle of the radar system.

In order to better understand the position of the fields of view and the orientation of the transceivers, reference will be made herein to typical operating parameters of the transceivers, as described below.

As is generally known, the field of view of a transceiver is represented by a power or amplitude radiation pattern of its transmitting or transmitting/receiving antenna in case of monostatic transceivers. In a normalized radiation pattern, a main (front) lobe comprises a maximum radiation direction, or main transmission direction, that is the direction of the maximum signal power, i.e. the maximum radiation or signal intensity. In a plane section representation, e.g. in the azimuthal plane, the radiation pattern expresses, as a function of an angle α (not shown) with respect to the maximum radiation direction, an attenuation between an electric-field width associated with the return signal 7, when the target 6 is situated at the considered angle α, and the amplitude of the return signal 7 when the target 6 is placed in the maximum radiation direction.

In addition to the front lobe, where the highest percentage of radiated power is concentrated, a rear lobe may be also provided, symmetric to the front portion, in which the radiated power is much lower than the power radiated in the front portion.

Preferably, the main transmission direction is in a central position with respect to the field of view 3a, 3b, 3c, and is perpendicular to the plane of the antenna in case of planar antennas. Generally, with reference to the normalized radiation pattern, attenuation is zero at α=0°, i.e. in the maximum radiation direction, whereas attenuation increases as angles increase away from the maximum radiation direction, along directions within the main lobe, thereby decreasing the probability of detecting an object. The fields of view of FIGS. 1 and 2 shall be intended to be schematic representations and may not depict the real shape of a radiation pattern.

The radiation aperture angle (i.e. the angular aperture of the field of view) of a transceiver is typically defined by the Half Power Beam Width (HPBW). The HPBW is given by the aperture angle of the main lobe between two directions, referenced 8a, 8a', 8b, 8b' and 8c, 8c' in FIG. 1, in which the attenuation of the return signal is 50% (i.e. −3 dB, in a normalized radiation diagram) of the maximum value, i.e. along the maximum radiation direction (α=0°). The term aperture angle of a transceiver is used herein to designate the HPBW.

The transceivers of the plurality of transceivers 2a, 2b and 2c are arranged such that their respective main transmission directions of each transceiver lie on a common plane, referenced hereinafter as detection plane. Misalignment tolerances may be also admitted, for instance up to 15°, preferably up to 10°, for transceivers with aperture angles greater than or equal to 60°.

In a preferred embodiment, the detection plane is the azimuthal plane of the respective transmitting (or transmitting/receiving) antenna of the transceivers.

The main transmission directions 5a, 5b, 5c of the plurality of radar transceivers 2a, 2b, 2c are different from each other and particularly incident, e.g. crossing at a single point P, behind the radar transceivers 2a, 2b, 2c. The point P is situated (within the detection plane) in the intersection area of the rear portions of the radiation patterns.

In a preferred embodiment, as shown in FIGS. 1 and 2, the radar system 1 comprises three radar transceivers 2a, 2b, 2c, which are angularly equally spaced from each other at an angle ranging from 30° to 60°, preferably of 45°, between the main transmission direction of the central transceiver 2b and the main transmission direction of the respective transceiver adjacent thereto 2a, 2c.

As mentioned above, the angular fields of view of adjacent transceivers of the plurality of transceivers partially overlap. For example, for a plurality of transceivers comprising more than two transceivers (in the case of the figures three transceivers) in adjacent pairs, with two outer transceivers 2a, 2c and at least one inner transceiver 2b, the field of view 3b of an inner transceiver 2b overlaps the angular fields of view 3a, 3c of the respective adjacent transceivers 2a and 2c.

Preferably, the field of view of each transceiver, for instance the field of view 3a of the transceiver 2a, angularly extends at least to the main transmission direction 5b of an adjacent transceiver 2b. Thus, at least half of the field of view 3 of a transceiver 2a overlaps at least half of the field of view 3b of a transceiver 2b adjacent thereto. In other words, the angle formed between the main direction of the central transceiver and the main direction of the outer transceiver adjacent thereto is equal to or less than half of the HPBW of the main lobes.

Preferably, each transceiver 2a, 2b, 2c has a field of view 3a, 3b, 3c with an aperture angle of at least 60°, in one embodiment ranging from 60° to 180°.

It will be appreciated that, in general, a transceiver having a field of view with a smaller aperture angle will be able to observe targets 6 at greater distances, under the same transmission power conditions. Narrower fields of view may require a greater number of transceivers to obtain a continuous region in space with a desired value of the coverage angle of the radar system.

While the embodiments as shown in the figures relate to a radar system that comprises three and not more than three radar transceivers, the radar system may comprise two or more transceivers, preferably three or more transceivers. Generally, as the number of radar transceivers increases, the coverage angle of the radar system also increases, considering transceivers having the same aperture angle. In one embodiment, the radar system comprises a plurality of radar transceivers arranged to cover an angle of 360°.

For example, the plurality of sensors may consist of 8 transceivers arranged to form an octagon, the main transmission directions of two adjacent transceivers forming an angle of 45°.

Preferably, the coverage angle of the radar system is greater than or equal to 90°, more preferably greater than or equal to 120°, even more preferably greater than or equal to 140°. In one embodiment, the coverage angle ranges from 140° to 360°, the coverage value depending at least partially on the number of transceivers of the radar system. In a particularly preferred embodiment, the coverage angle ranges from 120° to 180°.

The electronic controller 9 is configured to control generation of the signals transmitted by each transceiver, particularly to instruct each of the radio transceivers 2a, 2b, 2c to transmit a transmission radio signal 4.

Namely, the electronic controller 9 is configured to actuate the transceivers in sequence, i.e. to control the actuation of a (first) transceiver in an operating mode while maintaining at least the adjacent transceivers in a stand-by mode, and to receive a baseband signal from said transceiver.

In the operating mode, each transceiver transmits a radio signal at such a power as to allow detection of an object in its field of view. In the stand-by mode, the transceiver is not used to transmit and receive signals for detection of a target. In this mode, the transceiver may be set to avoid signal generation (e.g. the transceiver is off) or be configured to generate signals at reduced power. Alternatively, in the stand-by mode the transceiver may be configured to generate signals on a frequency band other than those used at least by the transceivers adjacent thereto, and in any case not useful for detection of the target.

After reception of the baseband signal from the first transceiver, the controller is configured to actuate the other transceivers in sequence to receive a plurality of baseband signals.

Preferably, all the individual radar transceivers of the plurality of transceivers are actuated in sequence in such a time interval that, in the time from actuation of a first transceiver to actuation of a last transceiver, the target 6 does not significantly change its position relative to the radar system 1. For example, in case of a target that moves at 15 m/s (e.g. faster than a running person) and assuming a 0.6 meter resolution cell for the radar system, the system may be configured to perform a scan on a plurality of three transceivers with a scan time from the first to the last transceiver of approximately 40 milliseconds. The terms "first" and "last" transceivers in the actuation sequence does not necessarily relate to the physical arrangement of the transceivers.

Once a sequence of actuation of all the radar transceivers has been completed, the direction of the target 6 is calculated as described below, and the controller is configured to proceed with a new sequence. The use of transceivers in sequence in the target detection mode prevents interference between measurements of different transceivers, and transmission of the corresponding signals in the same frequency range, e.g. with substantially equal signals for the various transceivers. Preferably, the stand-by mode of the transceivers other than the first transceiver is maintained until a baseband signal is output by the first transceiver.

Alternatively, a plurality of radio transceivers 2a, 2b, 2c may be actuated at the same time, with each transceiver 2a, 2b, 2c associated with a given frequency range in a bandwidth BW, frequency ranges being different for each transceiver of the plurality, or at least for adjacent transceivers.

Once the baseband signal and the range profile have been obtained for each transceiver, the target 6 is detected as a peak and a distance d. Namely, the controller is configured to calculate the distance of a target from each transceiver that received a return signal. In one embodiment, the controller is configured to calculate the mean value of the distances associated with the transceivers that detected the target (i.e. excluding transceivers that do not see the target) and to associate such mean value with the target, as the distance from the radar system.

Figure 4:
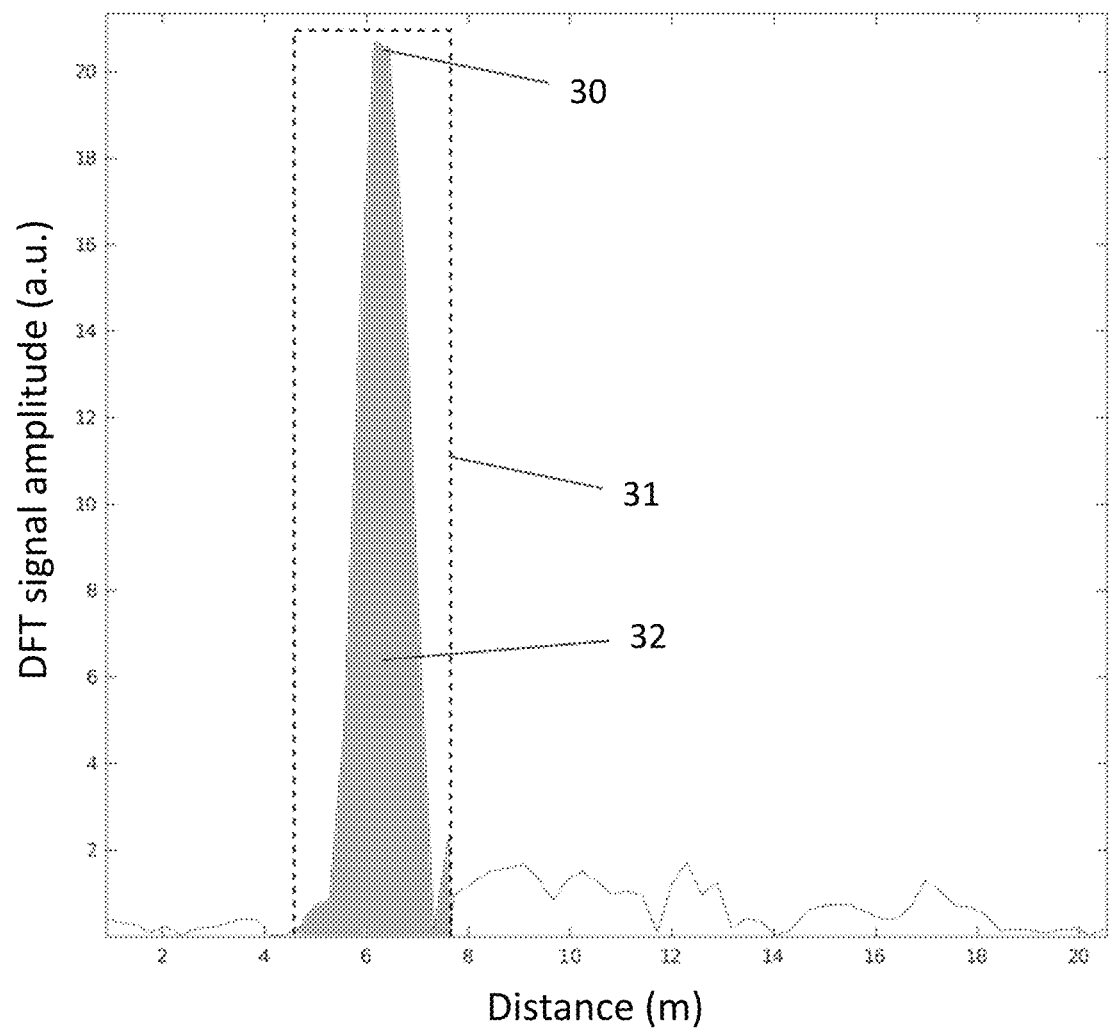
FIG. 4 is an exemplary chart of a range profile, associated with a FMCW transceiver, after background removal.

FIG. 4 is an exemplary diagram of a range profile calculated on a digital baseband signal output by a transceiver. The y axis of the diagram represents the amplitude of the signal of a main target (arbitrary units). The x axis of the diagram represents the distance of the target of the transceivers, expressed in meters. The diagram may be obtained, for example, from the baseband signal using a Fourier transformation. As explained below, for a signal transmitted according to an FMCW modulation each distance may be determined based on a frequency difference $\Delta f$ between the transmission signal and the reflected signal.

The peak 32, having an amplitude 30, is associated with a frequency difference value $\Delta f$ corresponding to the distance of the target from a transceiver. The width of the peak in general changes according to the target size, i.e. the echo of a large target may generate an enlargement of the corresponding peak.

The controller 9 is configured to detect the presence of at least one target 6, for instance a plurality of targets in a multi-target embodiment. In the preferred embodiment, detecting the presence of each target 6 comprises analyzing range profiles and selecting at least one amplitude peak in a range profile. In other embodiments, discussed below, the targets 6 may be detected from amplitude profiles as functions of quantities other than distance, which profiles can be generally obtained from Fourier transforms of baseband signals, and hence are also referred to as transformed profiles.

Amplitude peaks are determined among the amplitude values greater than a predetermined amplitude threshold value, thereby at least partially excluding the signal corresponding to a background noise. Preferably, amplitude peaks correspond to local maximum amplitude values in the respective range profiles or transformed profiles. In a single-target embodiment, the amplitude peak may correspond to the absolute maximum amplitude value within the spectrum.

In the preferred multiple-target case, the controller 9 is configured to identify a plurality of amplitude peaks in the range profiles and to determine a relative distance for each peak. Each target 6 has at least one respective amplitude peak in a range profile associated therewith. More in detail, for each target 6 within the field of view of multiple transceivers there is a peak for each of these transceivers at the distance of the target 6.

In case of multiple targets 6 at different distances from the transceivers there are amplitude peaks at different distances. It shall be noted that, depending on the position of the targets relative to the fields of view of the transceivers, the peaks at different distances may be situated in the same range profile or in different range profiles.

Therefore, each amplitude peak has to be associated to a target 6, to thereby determine whether distinct amplitude peaks are representative of the same target or distinct targets. Namely, the controller 9 is configured to associate each peak value with its corresponding distance value, e.g, based on the frequency difference Δf as discussed in greater detail below. In the example of the figure, the target is located 6 meters from the radar transceiver.

Therefore, the controller 9 is configured to compare the distances associated with distinct amplitude peaks, thereby determining that the amplitude peaks are representative of distinct targets if their distances differ at least by a distance threshold value. The distance threshold value may be determined by a skilled person depending on the resolution of the radar, the size of the field of view and the size of the targets that are expected to be detected.

Furthermore, the controller 9 may determine that the amplitude peaks are compatible with the same target 6 if their distances differ by less than the distance threshold value. Nevertheless, further checks may be envisaged to assess whether peaks located at similar distances from the transceivers, with a difference smaller than the distance threshold value, are representative of the same target or distinct targets located at a similar distance from the transceivers.

For example, the controller may determine that two peaks detected in the range profiles of two transceivers at two similar distances are representative of distinct targets if a third transceiver is located between the two transceivers, which does not detect any amplitude peak at a distance similar to these two distances, within the distance threshold value.

However, it cannot be excluded that the radar system will mistake for a single target two distinct targets that are close together.

In the preferred embodiment, the controller 9 is configured to select, for each target 6, an interval of distances (or window) 31 containing the corresponding amplitude peak 32, by a function that will be hereinafter also referred to as windowing. The windowing function is applied to the range profiles of at least the transceivers of the radar system for which the target 6 is detected, preferably each transceiver of the radar system. The interval of distances 31 comprises a neighborhood of the amplitude peak 32 in which the amplitude values of the range profile are greater than the amplitude threshold value.

Referring to FIG. 4, the window 31 selected by the windowing function, indicated with dotted lines, includes the peak 32 of amplitude 30 which identifies the target.

In the preferred embodiments, the same frequency window (or range) is applied to all the radar transceivers of the plurality, which are arranged close to each other and hence at the same distance d from the target 6. In the multiple-target embodiment each target 6 has a respective interval of distances associated therewith, distinct ranges being generally provided for different targets.

More in detail, assume a case in which a first target corresponds to a first amplitude peak in at least one range profile, and a second target corresponds to a second amplitude peak in at least one range profile, which may be the same range profile as the first amplitude peak or a range profile associated with a different transceiver.

The windowing function is used to select a first interval of distances comprising the first amplitude peak, and a second interval of distances comprising the second amplitude peak. The two intervals of distances are separate from each other. Preferably, each interval of distances is centered on the estimated distance for the respective target, as an average of the distances of the peaks detected for the target by the various transceivers.

Then, after detecting the presence of at least one target 6, and optionally after calculating its distance and applying the windowing function, the electronic controller is configured to determine a scalar amplitude value $s_1$, $s_2$, $s_3$ of the range profile associated with the target for each of the transceivers, or at least for the transceivers that detect the target.

In the preferred embodiment, the signal amplitude value is calculated as the area subtended by the signal (and particularly by the range profile) within the interval of distances selected in the windowing step, i.e. as the integral of the amplitude values in the window (gray area of the peak 32).

In the multiple target case, the controller (9) is configured to calculate the signal amplitude values for the first target by integrating range profiles associated with distinct transceivers into the first interval of distances, and the amplitude signal values for the second target by integrating range profiles associated with distinct transceivers (which may or may not coincide at least partially with those used for the calculation concerning the first target) in the second interval of distances. Therefore, for each target, the interval of distance values in the range profile (or anyway other x axis values of another kind of transformed profile) is the same for all the transceivers.

In another embodiment, the amplitude $s_1$, $s_2$, $s_3$ may be determined as the peak amplitude value representative of the target, in the range profile or another type of transformed profile from which the presence of a target may be detected. In this embodiment, the windowing step is not required.

In a different embodiment, the windowing step is not provided and the signal amplitude value for each transceiver is determined by calculating the integral of the amplitude values of the entire range profile or on the entire amplitude-frequency signal.

The amplitude information associated with the return signals 7 are used to determine the direction θ from which the received signal comes, i.e. the direction θ of each target 6, relative to the system 1. The direction angle is the angle formed by the direction of the vector relative to a reference direction, which preferably coincides with the main transmission direction of one of the transceivers.

The Applicant realized that the direction of a target may be estimated from a combination of the main transmission directions of the transceivers, in which each transceiver contributes to the direction based on the amplitude of the signal calculated for the target.

The return signal 7 picked up from a transceiver 2a has a maximum signal amplitude if the target 6 is located in the maximum radiation direction 5a of the transceiver 2a, such signal amplitude decreasing, considering the same radial distance of the target from the transceiver, as the target 6 moves away from the direction 5a, according to the radiation pattern of the antenna.

Particularly, the controller 9 is configured to determine the direction θ of each target 6 by calculating a weighted average of the main transmission directions 5a, 5b, 5c of the transceivers 2a, 2b, 2c, with each main transmission direction being weighted according to the corresponding amplitude value of the signal associated with the target 6. Of course, if multiple targets are detected, the direction of each target is calculated by only accounting for the amplitude values calculated for that target, for each transceiver that detects it.

In the preferred embodiment, as the controller 9 calculates the weighted average associated with a target 6, it is configured to determine, for the various transceivers, respective signal vectors, $\vec{V}_1$, $\vec{V}_2$, and $\vec{V}_3$ whose moduli are $s_1$, $s_2$, $s_3$ and whose directions coincide with the main transmission direction of the respective transceivers. The direction of each signal vector is identified by the direction of propagation of the radio signals emitted from the transceiver. FIG. 2 shows a schematic graphic representation of signal vectors for a target. In the figure, the transceiver 2c does not detect the target 6 and therefore is not indicated, as $\vec{V}_3=0$ because $s_3=0$.

More in detail, each transceiver 2a, 2b, 2c has a unit vector in $\vec{n}_1$, $\vec{n}_2$, and $\vec{n}_3$ associated therewith, which defines the axis and direction of propagation of the transmission signals from the corresponding radar transceivers (not shown). Each unit vector is oriented in the main transmission direction of the corresponding transceiver, e.g. normal to the plane of the antenna, in case of a planar antenna. Unit vectors are stored in the controller.

Each signal vector $\vec{V}_i$ is defined by the product of its unit vector $\vec{n}_i$ and the amplitude $s_i$ representative of the respective return signal received. Therefore, the controller 9 is configured to calculate a mean signal vector $\vec{V}_m$, as the average of the signal vectors for the respective radar transceivers 2a, 2b, 2c.

The direction θ of the target 6 is defined by the direction of the mean signal vector $\vec{V}_m$, in the detection plane, represented by a direction angle θ determined according to the following relation:

$$\theta = \varphi\left(\frac{1}{N}\sum_{i=1}^{N}\vec{n}_i \cdot s_i\right) = \varphi\left(\frac{1}{N}\sum_{i=1}^{N}\vec{V}_i\right) = \varphi(\vec{V}_m), \quad (1)$$

where φ is a function that associates a vector with its direction, for instance the phase function of a complex number if the vectors are so represented, which is expressed as an angle with respect to a reference direction, N is the total number of radar transceivers (in the example of the figures N=3), $\vec{n}_i$ is the unit vector for the $i^{th}$ transceiver, and $s_i$ is the signal amplitude for the $i^{th}$ transceiver. Of course, when determining the direction, the division by N is optional and does not affect the result in any manner. In other words, in order to calculate the direction, a sum vector may be used instead of a mean vector.

If one or more transceivers do not detect the target (for example, the transceiver 2c of FIG. 2), the signal vector/s associated with such transceivers have zero amplitude. A signal vector with zero amplitude does not contribute to vector calculation of the direction angle.

Equation (1) provides an estimate of the angle θ if the target is simultaneously observed by at least two radar transceivers.

If the target is seen by one transceiver only of the plurality of transceivers, only the vector for such transceiver has an amplitude greater than zero, whereas the vectors of the other transceivers have zero amplitude. In this case the mean signal vector of the signal is in the main transmission direction of the transceiver that picked up the return signal reflected from the target.

The angular range of the possible direction angles θ ranges between the two unit vectors associated with the outermost radar transceivers of the plurality of radar transceivers, e.g. The devices 2a and 2c in FIGS. 1 and 2.

The generation of the transmission signal will be now described, as well as the preferred processing to generate the range profiles from the baseband signal. This generation and processing are described both in general terms and according to a few specific embodiments.

The controller 9 is configured to receive the baseband signal from each transceiver 2a, 2b, 2c. The analog baseband signal received from each transceiver is digitized, thereby producing a plurality of digital baseband signals. The controller is configured to perform a Fourier transform of each baseband signal received from the respective transceiver, for instance a Direct Discrete Fourier Transform (DFT) or an Inverse Discrete Fourier Transform (IDFT) depending on the type of transmitted signal in use, as described below. The signal obtained from the Fourier transform is represented by an y-axis amplitude and a x-axis transformation quantity that can be, for example, frequency or time. In other words, this will provide an amplitude-frequency spectrum or an amplitude-time spectrum. Optionally, the x-axis values may be converted into distance, as is known per se, to provide a range profile, or into speed.

Nevertheless, even when there is no actual conversion of the x-axis values, the transformation quantity may be deemed to be representative of a distance or speed, and hence equivalent thereto.

Reference will be generally made herein to a transformation-domain signal (frequency, time or speed), whose transformation domain depends on the waveform of the radio signal transmitted from the transceivers.

Figure 3:
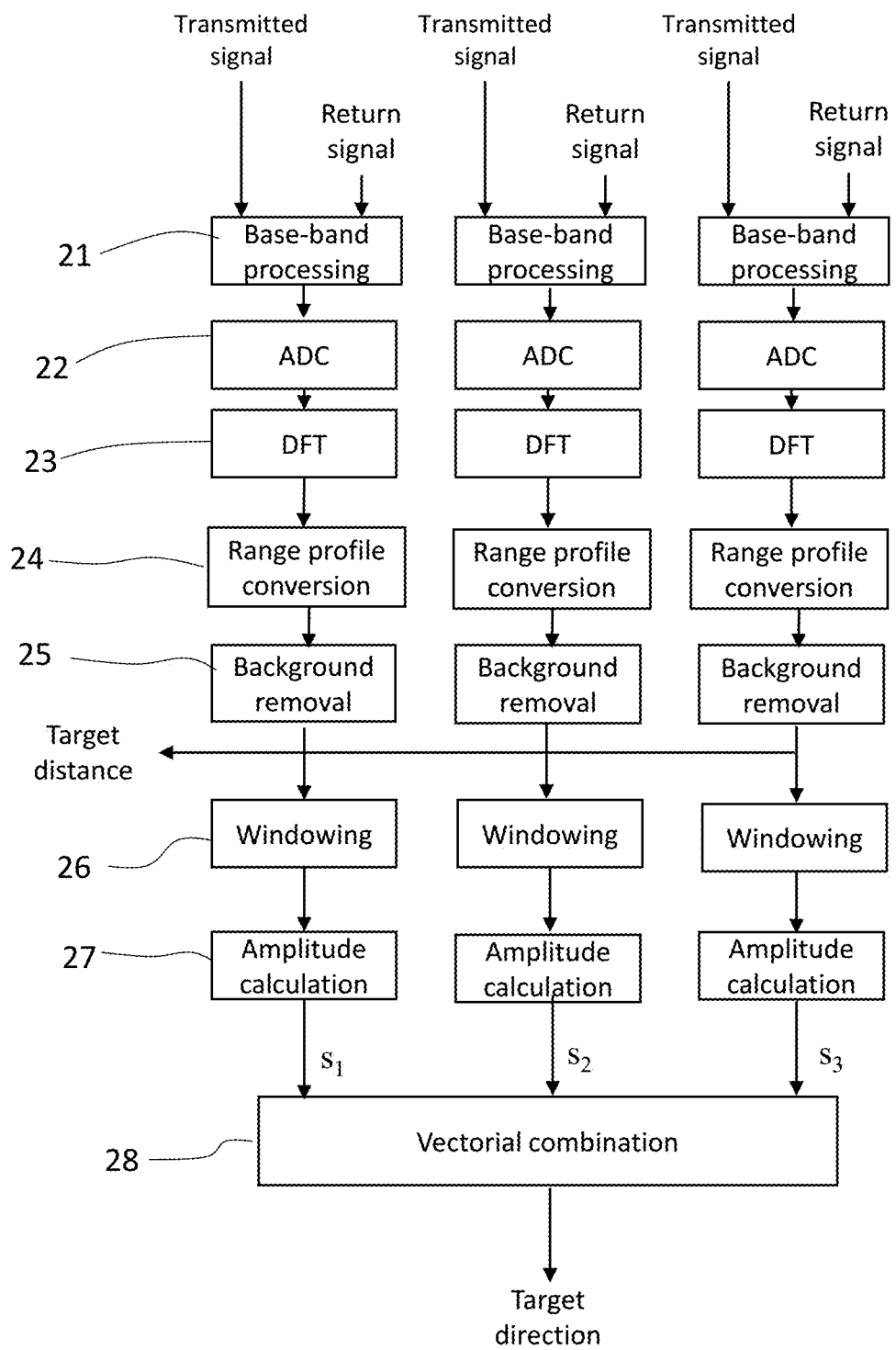
FIG. 3 shows a flow chart representative of the steps for processing the signals received by the radar system, according to one embodiment.

In a preferred embodiment, each transceiver is an FMCW transceiver configured to transmit a linear frequency modulated continuous-wave transmission signal 4. FIG. 3 shows a flow diagram which schematically illustrates processing of the signals picked up by a plurality of radar transceivers to obtain the direction θ of a target, according to this embodiment. Although the method of FIG. 3 is implemented on a system with three transceivers, what will be described with reference to this figure will also apply to a system with N transceivers, N≥2.

Frequency modulation in the time domain is typically defined by a linear frequency sweep having a duration T within a frequency band having a bandwidth BW. Frequency variation is, for example, a linear ramp modulation from a minimum to a maximum frequency values in a sweep time $t_{sweep}$. For simplicity, reference will be made hereinafter to ramp modulation. The considerations applying to ramp modulation will be also applicable to the other linear modulations.

As is known per se, a linear ramp may be generated with an open-loop or closed-loop implementation in a feedback circuit connected to an input of a transceiver. For this purpose, the signal generator may be for example a PLL module for generating a continuous wave with a desired frequency variation with time.

As discussed above, after transmission of a signal and acquisition of a return signal, each transceiver of the plurality of transceivers is configured to process the transmission signals and the return signals and for producing a respective analog baseband signal (step 21), which is digitized by the controller (step 22).

Optionally, after digitization (step 22), the method comprises calculating a time average of a plurality of digital baseband signals acquired with successive frequency sweeps, i.e. using a coherent integration technique, to improve the signal-to-noise ratio. These operations are well known in the field of radar transceiver signal processing.

Optionally, the FMCW transceivers may be configured to also perform a first (analog) filtering operation to eliminate the low frequency components of the signals, e.g. using a high-pass filter, and a second (analog) filtering operation to prevent "aliasing" (distortion due to slow sampling) during sampling, e.g. using a low-pass filter. Filtering of the low-frequency components can eliminate DC components, i.e. at zero frequency, which are representative of the baseband-converted transmitted signal.

By such filtering operation, a component will be selected in the baseband signal, whose frequency is given by the frequency difference $\Delta f$ between the transmission signal and the reflected signal. This component is caused by the time delay given by the time required by the signal to travel a distance d from a transceiver to the target 6 and from the target 6 to the same transceiver. For example, the reflected signal may have a lower frequency than the transmission signal in case of an increasing frequency ramp modulation.

As is known per se, the return signal 7 generally has substantially the same waveform as the transmitted signal 4, but it is collected by a transceiver with a smaller signal amplitude as compared with the transmitted signal 4, and with the aforementioned time delay. The distance d of a stationary target is therefore equal to:

$$d = \frac{\Delta f \cdot v \cdot T}{2 \cdot BW}, \quad (2)$$

where $v$ is signal speed in the medium. For air applications, $v$ corresponds to the speed of light c.

Therefore, the method comprises transforming each digital time-domain baseband signal in the into a digital frequency-domain signal by means of a DFT (step 23), and converting each frequency signal into a range profile by converting the frequency values $\Delta f$ into respective distance values using the equation (2), i.e. step 24.

Then the method proceeds to a step 25 of removing the background signal, which is well known and described later, as well as to the above described steps of determining the distance of the target and windowing (step 26), calculating the signal amplitude associated with each target (step 27), and calculating the direction of the target (step 28), preferably by vector combination.

Figure 6:
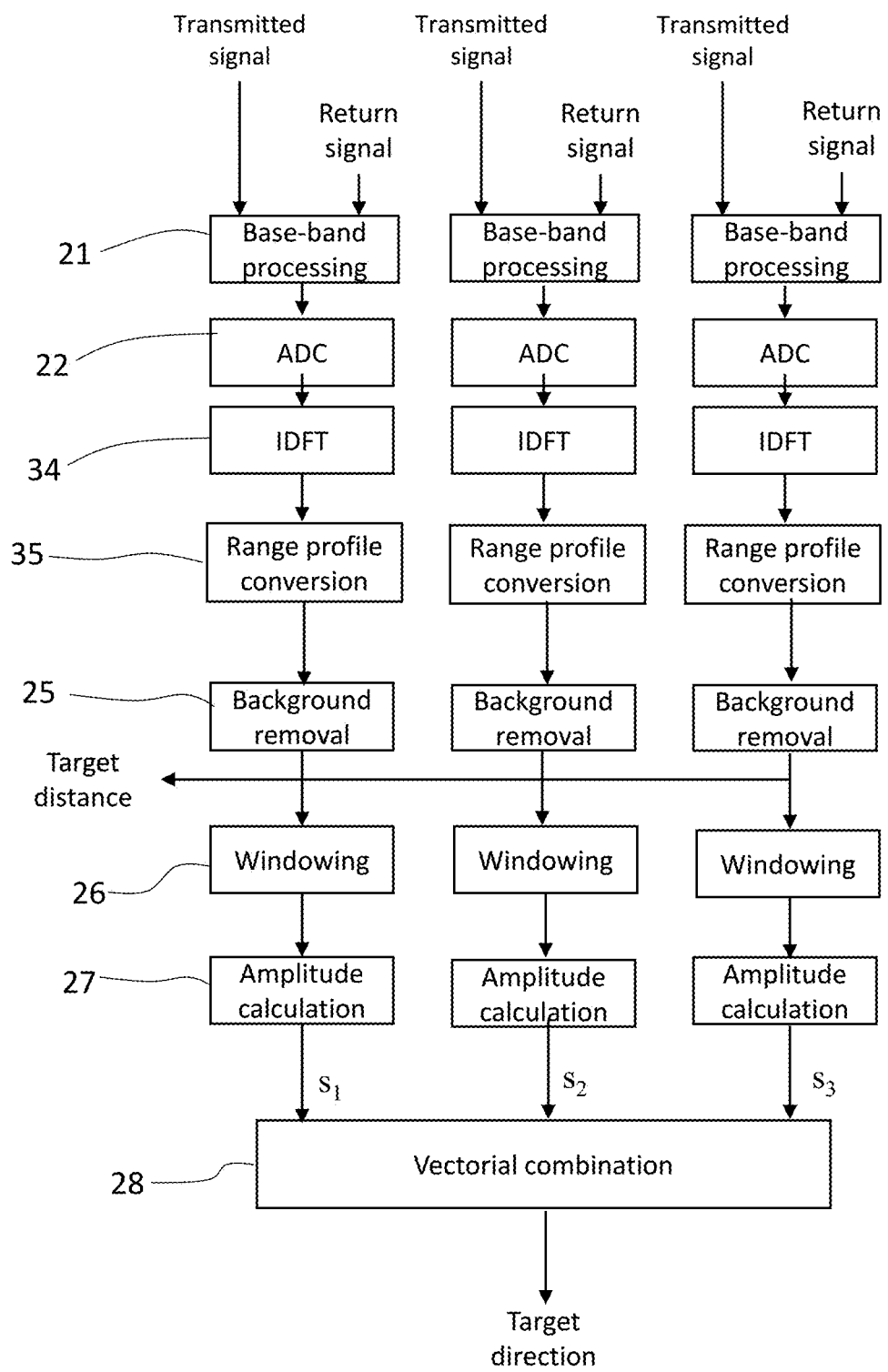
FIG. 6 shows a flow chart representative of the steps for processing the signals received by the radar system, according to a further embodiment.

In a further embodiment, each transceiver is an SMCW transceiver configured to transmit a stepped-frequency continuous-wave transmission signal 4. FIG. 6 shows a flow diagram which schematically illustrates processing of the collected signals according to this embodiment Like numerals designate process steps similar to corresponding steps of FIG. 3, excepting differences expressly described hereinafter or directly arising from the diversity of the radio signals transmitted and received.

As is generally known, SFCW transceivers transmit a sequence of M constant-frequency sine-wave signals at a constant frequency having a duration $T_{tone}$, in which each frequency f increases in constant and discrete frequency steps from a minimum frequency, $f_{min}$ to a maximum frequency $f_{max}$, in a frequency band having a bandwidth BW, according to the formula $f=f_{min}+k\Delta f_1$, with $k=0, 1, \ldots$, (M−1) and $f_{max}=f_{min}+(M-1)\Delta f_1$. The sequence of M signals is usually indicated with signal sweeps. Each sine signal receives a frequency response of the sampled scenario with regular steps. The sequence of M sampling signals constitutes the radio transmission signal generated by each transceiver and the respective sequence of frequency sine-wave signals received from a transceiver constitute the return signal of such transceiver.

As discussed above, the transmission signals and the return signals of each transceiver are processed, filtered and sampled to produce respective analog and then digital baseband signals (steps 21 and 22).

Here, the information to be selected by filtering is contained in the continuous zero-frequency component of the baseband signal because beat occurs with two signals having the same frequency, and different amplitudes and phases. Therefore, the filter may be a low-pass analog filter.

Then, the method comprises transforming each frequency digital baseband signal into a digital time-domain signal (step 34), using an Inverse Discrete Fourier Transform (IDFT). In the discrete domain of the inverse Fourier transform, each bin (discrete x-axis value) in time is ½·BW which, when converted into distance, is equal to c/2·BW, where c is the speed of light and BW is the bandwidth covered by all the frequencies of the sweep. The signal in the domain of the Inverse Discrete Fourier Transform (IDFT) is an amplitude-time signal.

Analysis of the IDFT signals, preferably after background removal (step 25), allows calculation of the distance of a target from each transceiver that detected it. The distance d of a target from a SFCW transceiver is given by:

$$d = \frac{m \cdot c}{M \cdot 2 \cdot \Delta f_1} = \frac{m \cdot c}{2 \cdot BW}, \quad (3)$$

where m is the $m^{th}$ bin of the IDFT signal of such a transceiver, which is composed of M bins and $\Delta f_1$ is the frequency pitch of the transmission signal. Then the method comprises converting each time-domain signal into a range profile using Equation (3), i.e. step 35.

Also in this case, the method proceeds with the steps of determining the distance of the target and windowing (26), calculating the signal amplitude associated with each target (27), and calculating the direction of the target (28).

Figure 7:
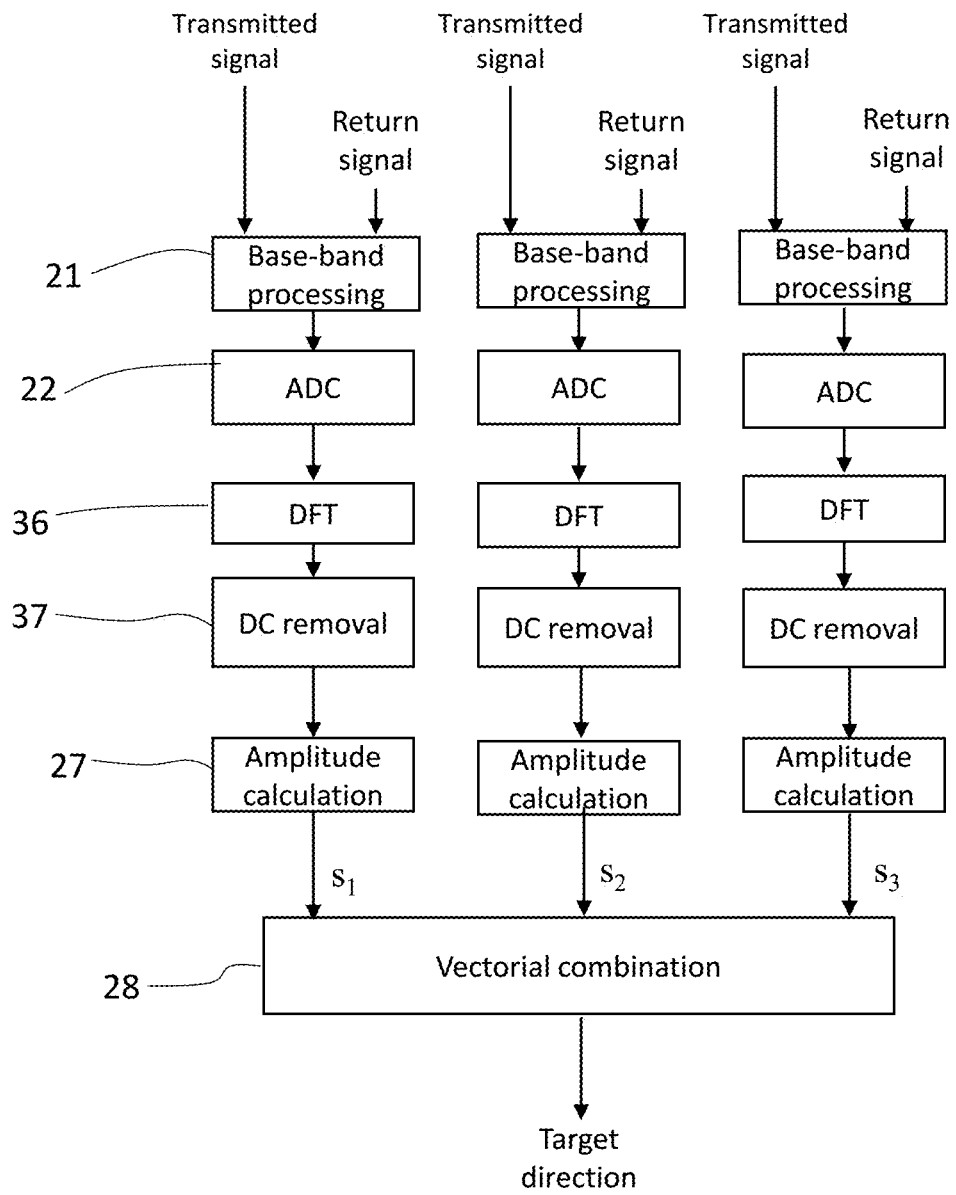
FIG. 7 shows a flow chart representative of the steps for processing the signals received by the radar system, according to a different embodiment.

In a third embodiment, each transceiver is a CW transceiver configured to transmit an unmodulated continuous-wave transmission signal 4. FIG. 7 shows a flow diagram which schematically illustrates processing of the collected signals according to this embodiment. Like numerals designate process steps similar to corresponding steps of FIG. 3, excepting differences expressly described hereinafter or directly arising from the diversity of the radio signals transmitted and received.

A CW transceiver is able to measure the speed and the direction of a moving target from the so-called Doppler shift of the frequency of the return signal. When a moving target is located within a field of view created by a signal at a frequency $f_0$, the return signal will have a frequency $f_0+f_D$, where $f_D$ is the frequency component due to the Doppler effect. Therefore, the difference between $f_0$ and the frequency of the received signal is a direct measurement of the radial velocity.

In case of monostatic or pseudo-monostatic CW transceivers, the radial component of the relative velocity $v_r$ of the target relative to the transceiver and the Doppler frequency $f_D$ are associated by the relation:

$$f_D=(2v_r)/\lambda \quad (4)$$

where $\lambda$ is the wavelength corresponding to the frequency $f_0$, where $f_D$ can have either a positive or a negative sign, depending on whether the detected object is moving toward or away from the transceiver. As discussed above, the return signal is converted to a baseband signal (step 21) and digitized (step 22). In this embodiment, the baseband signal is a zero-frequency signal if no moving object has been detected in the field of view of the transceiver, or a signal comprising frequencies greater than zero ($f_D$) if targets have been detected that are radially moving relative to the transceiver.

A discrete Fourier transform is applied to each digital time-domain baseband signal in the time domain, to thereby produce a respective plurality of Fourier spectra in the frequency domain (step 36). In case of baseband signals derived from CW radio signals, the x axis of a DFT spectrum is proportional to the radial velocity of a target. Equation (4) may be used to convert the transformation-domain signal (amplitude-frequency) to an amplitude-speed signal, thereby obtaining what is often called velocity profile or Doppler profile.

Referring to the foregoing, the signal component at a zero Doppler frequency ($F_D$=0 Hz), produced by the stationary objects (background), may be eliminated by the transceivers by applying a high-pass filter to the analog baseband signal, which eliminates the DC component from the signal, or may be directly eliminated from the range profile by the controller (step 37). Therefore, a background removing step is not required.

Once the zero-velocity component (produced the stationary objects) has been eliminated, the controller proceeds with the analysis of the speed profile by identifying amplitude peaks, representative of targets, by calculating an amplitude value for each transceiver, and hence the direction of the target, as described above with reference to FIG. 3. Here, the windowing function may include selection of a velocity range.

Figure 5:
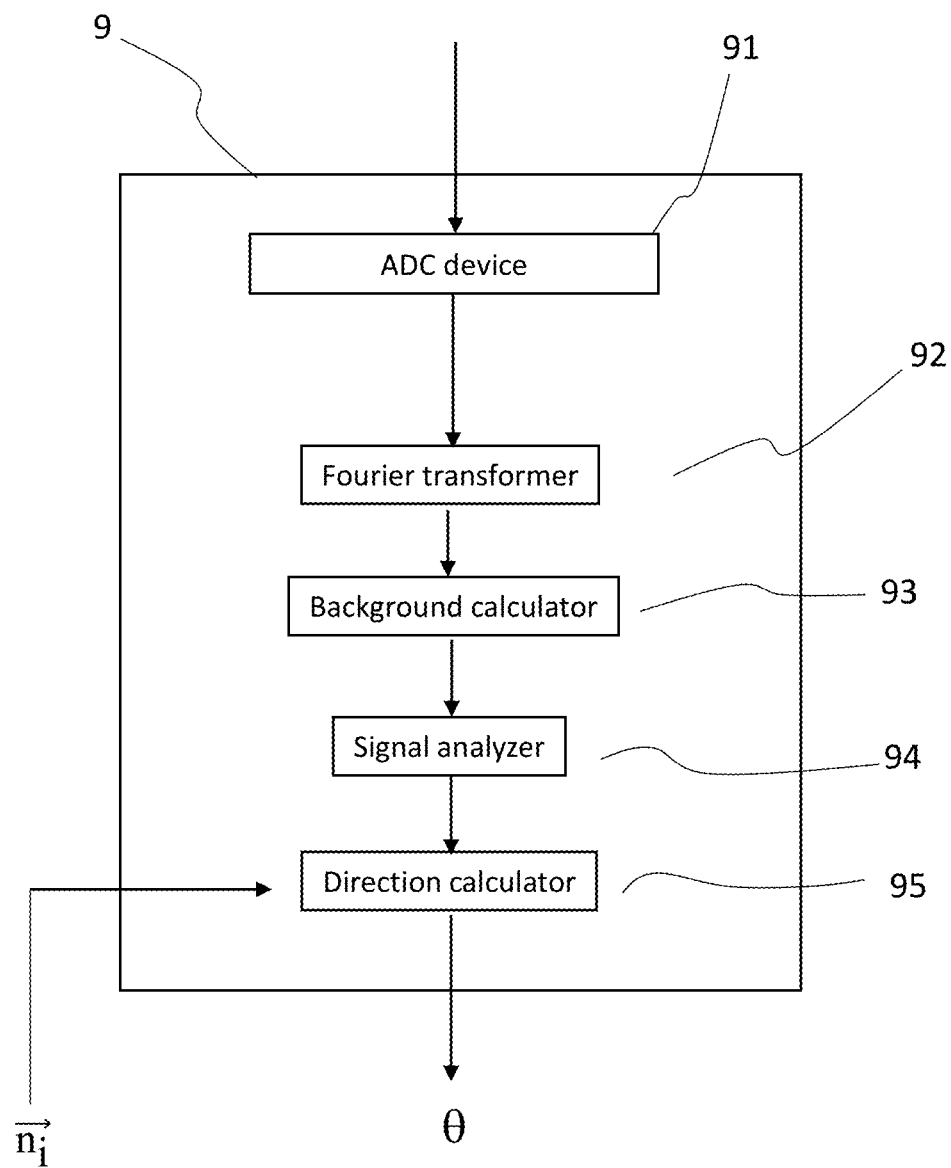
FIG. 5 shows a block diagram of an electronic controller according to one embodiment.

FIG. 5 is a block diagram which depicts the electronic controller 9 according to one embodiment, which is adapted to carry out any of the above described methods. The electronic controller 9 of FIG. 5 comprises:

an ADC sampling device 91 that receives analog baseband signals from each transceiver and converts them into digital baseband signals;

a Fourier transformer 92 which receives an input digital baseband signal, applies a DFT or an IDFT to the received digital baseband signal and provides an output digital transformation-domain signal;

optionally a background removing calculator 93, further described below;

a signal analyzer 94 that analyzes the digital transformation-domain signal (after background removal, if needed) thereby calculating an amplitude value for the signal, and a direction calculator 95 which receives the amplitude value of the signal from the signal analyzer 94 and, upon reception of a signal amplitude value from each transceiver of the plurality of transceivers, calculates the direction angle θ as defined in Equation (1).

In one embodiment, in which the controller, after reception of the baseband signals from each transceiver, is configured to simultaneously process the signals of more than one transceiver, the controller comprises a plurality of ADC devices 91 (one for each transceiver), a plurality of Fourier transformers 92 and optionally a plurality of background removing calculators 93. Here, the signal analyzer 95 receives the digital transformation-domain signals from each module 93.

As mentioned above, particularly in case of transmission of FMCW and SFCW signals, in order to be able to discriminate between a possible target of interest and stationary objects which reflect the transmitted RF signals, the controller is configured to subtract a background signal from each transformation-domain signal using a background removing calculator 93. The term moving is intended to also contemplate slow and/or short movements, e.g. breathing movements of a person or a small movement of a limb of a person.

In most of applications of an SRD radar, in addition to the signal reflected from a target, the return signal 7 generally also includes a signal reflected from the surrounding environment, in which may be situated objects "stationary" that reflect the RF signals transmitted, e.g. walls, floors, or furniture that generate an echo return designated as background signal. Therefore, the controller is preferably configured to store a background range profile and to remove the background signal (step 25) by subtracting it from each range profile calculated in step 24. Preferably, background removal is performed on each range profile associated with a respective transceiver.

Before storing the background range profile, the method comprises determining the range profile of a background signal using well-known techniques, some of which will be described below. The background signal may be obtained directly as a range profile (by iteratively calculating an average of range profiles acquired during normal operation of the system) or by acquiring a baseband signal, without targets.

A known background removal technique is based on continuous background estimate, in which the background signal picked up from each transceiver is continuously estimated and updated even when targets are present. The technique uses "averaging" between successive acquisitions of baseband signals from each transceiver to obtain an estimate of the background that continuously changes with time, but tends to assume a time-constant signal on average. The baseband signals collected from each transmitter are processed according to steps 21 to 23 to produce respective transformation-domain signals. Step 25 comprises iteratively calculating an average signal of a plurality of transformation-domain signals that have been previously acquired and associated with a transceiver and subtracting the average signal from the signal obtained by step 23 (i.e. the signal associated with the last acquisition) to remove the background. If a step 24 is present, then the average signal calculated in step 25 is an average range profile and step 25 comprises subtracting said average range profile from the range profile calculated in step 24 for each transceiver.

A further known technique is the empty space technique, which includes recording the spectrum of the background signal, by analyzing the frequency of the baseband signal, without targets. Here, a return signal is acquired from each transceiver without targets, steps similar to steps 21 to 24 are carried out to obtain a digital baseband background signal, that is transformed using the DFT, and is converted into a background range profile using Equation (2). The background range profile associated with each transceiver is stored in the controller 9 and step 25 comprises subtracting the respective background range profile from each range profile obtained from step 24.

A further technique is range-Doppler separation. In case of a moving target 6, the frequency difference Δf between the transmitted signal and the return signal is not only caused by the time delay between the signals, but also by the Doppler effect. The amount of the Doppler effect may be assessed using well-known techniques, e.g. by modulating the transmitted signal 4 according to a triangular-wave frequency variation cycle. Frequency differences Δf are then processed in the increasing frequency ramp and in the decreasing frequency ramp of of the triangular wave, and the frequency difference components Δf caused by the time delay and the Doppler effect are distinguished. Namely, assuming that $\Delta f_1$ and $\Delta f_2$ are the frequency differences between the transmitted signal and the return signal as measured during the increasing ramp and the decreasing ramp of the triangular wave respectively, the frequency difference due to the delay time $\Delta f_t$ to be used to estimate the distance d of the target and the frequency difference due to the Doppler effect $\Delta f_d$ are respectively:

$$\Delta f_t = \frac{\Delta f_1 + \Delta f_2}{2}, e \quad (5)$$

$$\Delta f_d = \left| \frac{\Delta f_1 - \Delta f_2}{2} \right|.$$

In this embodiment, the controller 9 is configured to detect the presence of a Doppler effect for each harmonic of the DFT signal. Assuming that the target 6 is moving and the environment is stationary, the controller 9 excludes the harmonics in which no Doppler effect is detected and identifies the target 6 in the harmonics that contain the Doppler effect.

A skilled person may obviously envisage a number of changes to the above described embodiments, without departure from the scope of the appended claims.

The invention claimed is:

1. A system for determining the direction of a target comprising:
a plurality of transceivers, each transceiver being configured for emitting a continuous-wave transmission radio signal in a respective main direction of transmission, the transmission radio signal covering a respective field of view, for receiving a return radio signal and for generating a baseband signal based on respective transmission and return signals, wherein the fields of view of adjacent transceivers partially overlap to each other, and wherein the transceivers are so arranged that the main directions of transmission of the plurality of transceivers lie in a detection plane and the main directions of transmission of adjacent transceivers are distinct from each other, and
an electronic controller connected to each of the plurality of transceivers and configured for:
receiving a baseband signal from each transceiver of the plurality of transceivers, processing said baseband signals to obtain a range profile for each transceiver, which range profile consists of a signal amplitude profile, as a function of the distance from the transceivers,
analyzing the range profiles to detect the presence of at least one target and to calculate, for each target, respective signal amplitude values associated with distinct transceivers,
determining a direction of each target by calculating a weighted average of the main transmission directions of the transceivers, wherein each main transmission direction is weighted according to the corresponding amplitude value of the signal associated with the target,
wherein:
the controller, when detecting the presence of each target, is configured to select at least one amplitude peak in a range profile, and
the controller, when calculating the signal amplitude values associated with each target, is configured to select at least one interval of distances that comprises the corresponding amplitude peak identified, and to calculate integrals of the range profiles associated with distinct transceivers in said interval of distances.

2. A system as claimed in claim 1 wherein:
the controller is configured to detect the presence of a plurality of targets, a first target corresponding to a first amplitude peak in at least one range profile, a second target corresponding to a second amplitude peak in at least one range profile,
the controller is configured to calculate the signal amplitude values for the first target by integrating range profiles associated with distinct transceivers in a first interval of distances comprising the first amplitude peak, and
the controller is configured to calculate the signal amplitude values for the second target by integrating range profiles associated with distinct transceivers in a second interval of distances, separated from the first interval of distances and comprising the second amplitude peak.

3. A system as claimed in claim 2 wherein the controller, when detecting the presence of a plurality of targets, is configured to:
identify a plurality of amplitude peaks in the range profiles and determine for each peak a relative distance, and
compare the distances for distinct amplitude peaks, thereby determining that the amplitude peaks are representative of distinct targets if their distances differ at least by a distance threshold value.

4. A system as claimed in claim 1, wherein the controller, when calculating a weighted average of the main transmission directions, is configured to:
determine a signal vector for each transceiver, wherein each signal vector is defined by a direction of transmission and a modulus, the direction of transmission of the signal vector coinciding with the main direction of transmission of the corresponding transceiver and the modulus being equal to the amplitude value of the signal associated with the target, calculated for the corresponding transceiver, and
calculate an average signal vector from the plurality of the signal vectors, wherein the direction of the target is defined by the direction of said average signal vector in the detection plane.

5. A system as claimed in claim 1, wherein the transceivers of the plurality of transceivers are arranged close to each other, such that the distance of a target within the field of view of adjacent transceivers is substantially equal for said adjacent transceivers.

6. A system as claimed in claim 1, wherein the controller, when processing the baseband signals, is configured to:
perform an analog-to-digital conversion on each baseband signal received from the respective transceiver, thereby generating a respective digital baseband signal;
transform each digital baseband signal using a discrete Fourier transform, thereby obtaining a plurality of transformed amplitude signals as functions of a transformation quantity, and
convert the transformation quantity values of each transformed signal into distance values, thereby producing a respective range profile.

7. A system as claimed in claim 1, wherein the electronic controller, when detecting the presence of a target, is configured to:
select range profiles having at least one amplitude value greater than a predetermined amplitude threshold value, and in each selected range profile, identify said amplitude peak value as a local maximum amplitude value greater than said amplitude threshold value, in the respective range profile.

8. A system as claimed in claim 1, wherein the electronic controller, after obtaining said range profiles and before detecting the presence of at least one target, is configured to remove a respective background range profile, representative of stationary objects in the field of view of the transceivers, from each range profile associated with the respective transceiver.

9. A method of determining the direction of a target comprising:
transmitting a plurality of continuous-wave radio signals from a respective plurality of transceivers, the transmission radio signals covering respective fields of view, and being directed along main directions of transmission lying in a detection plane, wherein the fields of view of adjacent transceivers of the plurality of transceivers partially overlap and the main directions of transmission of adjacent transceivers are distinct from each other;
receiving by each transceiver a respective return radio signal, associated with the corresponding transmission radio signal, and producing a baseband signal based on respective transmission and return radio signals to thereby produce a plurality of baseband signals corresponding to the plurality of transceivers;
processing said baseband signals to obtain a range profile for each transceiver, which range profile consists of a signal amplitude profile, as a function of the distance from the transceivers;
analyzing the range profiles to detect the presence of at least one target and to calculate, for each target, respective signal amplitude values associated with distinct transceivers;
determining a direction of each target by calculating a weighted average of the main transmission directions of the transceivers, wherein each main transmission direction is weighted according to the corresponding amplitude value of the signal associated with the target;
wherein:
detecting the presence of each target comprises selecting at least one amplitude peak in a range profile; and
calculating the signal amplitude values comprises, for each target, selecting at least one interval of distances that comprises the identified amplitude peak, and calculate integrals of the range profiles associated with distinct transceivers in said interval of distances.

10. A method as claimed in claim 9, comprising:
detecting the presence of a plurality of targets, a first target corresponding to a first amplitude peak in at least one range profile, a second target corresponding to a second amplitude peak in at least one range profile,
calculating the signal amplitude values for the first target by integrating range profiles associated with distinct transceivers in a first interval of distances which comprises the first amplitude peak, and
calculating the signal amplitude values for the second target by integrating range profiles associated with distinct transceivers in a second interval of distances, separated from the first interval of distances and comprising the second amplitude peak.

11. A method as claimed in claim 10, wherein detecting the presence of a plurality of targets comprises:
identifying a plurality of amplitude peaks in the range profiles and determining a relative distance for each peak,
comparing the distances for distinct amplitude peaks, thereby determining that the amplitude peaks are representative of distinct targets if their distances differ at least by a distance threshold value.

12. A method as claimed in claim 9, wherein calculating a weighted average of the main transmission directions comprises, for each target:
determining a signal vector for each transceiver, wherein each signal vector is defined by a direction of transmission and a modulus, the direction of transmission of the signal vector coinciding with the main direction of transmission of the corresponding transceiver and the modulus being equal to the signal amplitude value calculated for the corresponding transceiver, and
calculating an average signal vector from the plurality of the signal vectors, wherein the direction of the target is defined by the direction of said average signal vector in the detection plane.

13. A method as claimed in claim 9, further comprising, after obtaining said range profiles and before detecting the presence of at least one target, removing a background range profile, representative of stationary objects in the field of view of the transceivers, from each range profile.

14. A method as claimed in claim 9, wherein the transceivers are configured for alternating an operating mode and a standby mode and the step of transmitting comprises sequentially transmitting the transmission signals from the respective transceivers by setting the operating mode for a transceiver and the standby mode for the remaining transceivers of the plurality such that, while a transceiver in the operating mode transmits a transmission radio signal and receives a return radio signal, the remaining transceivers are in the standby mode.

15. A method as claimed in claim 9, wherein the method is for determining the position of a target on the detection plane, the transmission radio signals are linear frequency modulated continuous-wave signals, the step of processing the baseband signals comprising:
transforming each baseband signal using a Fourier transform, thereby obtaining a plurality of transformation-domain signals, which are amplitude signals as a function of a frequency difference, and
converting the frequency difference values of each frequency signal into respective distance values, to thereby obtain a respective range profile as a function of the distance for the associated transceiver.

* * * * *